(No Model.)
H. NEVILL.
BICYCLE, &c.
No. 601,978.  Patented Apr. 5, 1898.
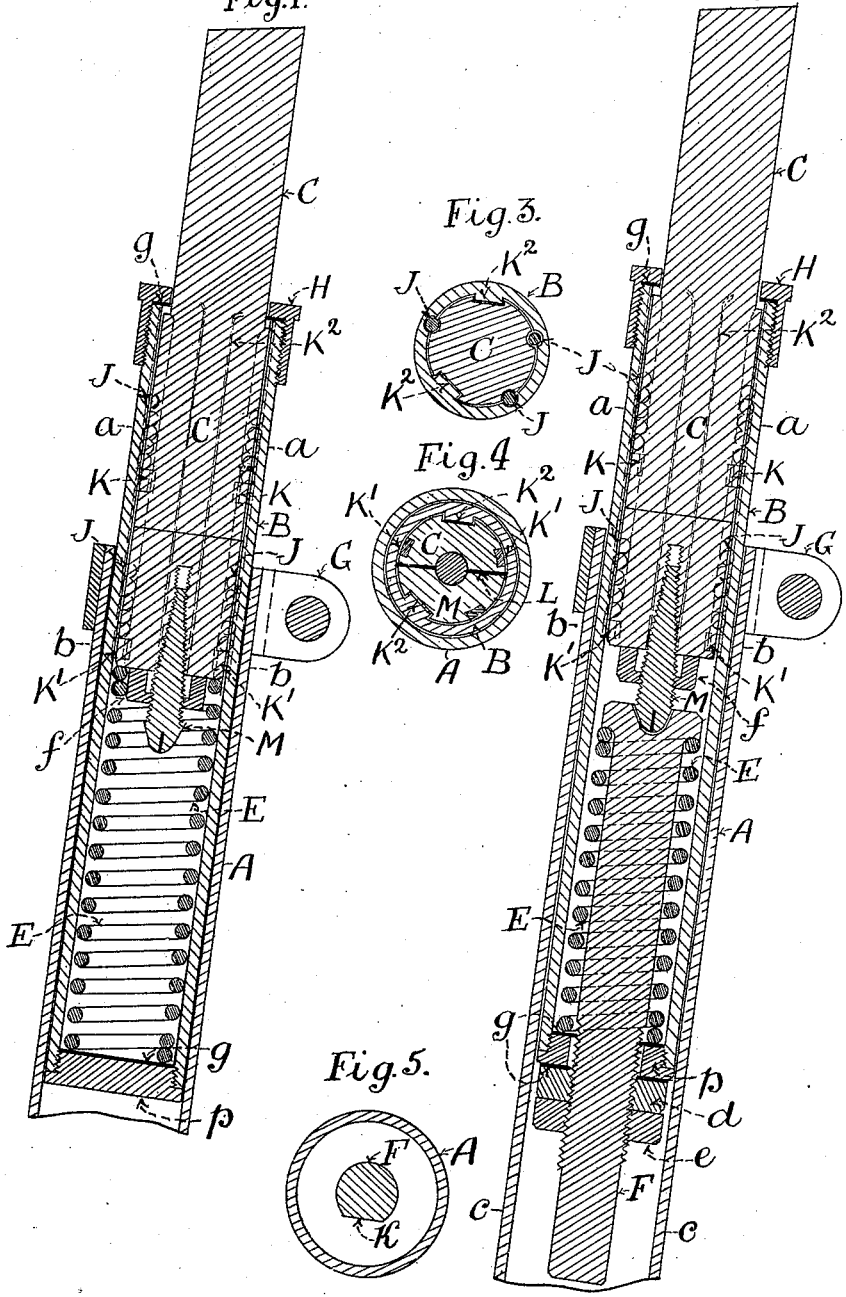
Witnesses.
Arthur Thomas Davies
Charles Brasnett.
Inventor
Henry Nevill
per Herbert Priest Blake
Attorney

UNITED STATES PATENT OFFICE.

HENRY NEVILL, OF SOUTHAMPTON, ENGLAND.

BICYCLE, &c.

SPECIFICATION forming part of Letters Patent No. 601,978, dated April 5, 1898.

Application filed May 3, 1897. Serial No. 634,946. (No model.)

*To all whom it may concern:*

Be it known that I, HENRY NEVILL, a subject of the Queen of England, residing at Southampton, in the county of Hants, England, have invented certain new and useful Improvements in or Relating to Bicycles and Such Like Vehicles; and I do hereby declare the following to be a full, clear, and exact description of the said invention, such as will enable others skilled in the art to which it appertains to make and use the same.

My invention relates to bicycles and such like vehicles, more especially to the seats or saddles of same.

The main object of my said invention is to minimize or allay the jolting or concussion at the seat or saddle of bicycles and such like vehicles caused by the vehicle going over obstructions on or the unevenness of the road.

My invention principally consists in the improved means and appliances I adopt to allay jolting or concussion at the seat or saddle of bicycles and such like vehicles. I attain this object by the means and apparatus substantially described herein and illustrated in the accompanying drawings, in which—

Figure 1 is a central sectional elevation showing my apparatus as made and fitted in the head of the seat-pillar tube of a bicycle or such like vehicle according to one form or modification of my invention; Fig. 2, a like view showing my apparatus as made and fitted in the head of the seat-pillar tube of a bicycle or such like vehicle according to another form or modification of my invention. Fig. 3 is a complete sectional plan taken at *a a;* Fig. 4, a complete sectional plan taken at *b b;* Fig. 5, a complete sectional plan taken at *c c.*

Similar letters of reference indicate corresponding parts in all the figures.

A represents the head of the seat-pillar tube of a bicycle or such like vehicle; B, a cylinder or tube of any convenient desired length; C, a piston or plunger made to fit nicely in the cylinder B at its lower end and to project above the top of cylinder, so as to carry the seat or saddle, which is mounted on same directly or indirectly in manner as now usually adopted. Between the bottom of the piston C and the bottom of the cylinder B, I fit a coil-spring E.

Referring more especially to Fig. 1, after inserting the spring E in the cylinder B, at the bottom of same, I close the bottom by means of a screw-plug *p*, and thus form a solid bottom to the cylinder B. The bottom of the said spring will then rest on the bottom of the cylinder, and the bottom of the piston C will rest on the top of the spring, so that the piston is free to move up and down in the cylinder resting on the spring. According to another form or modification of my invention I arrange that the said spring shall embrace a spindle F, which will project at its lower end through a hole provided in the bottom *p* of cylinder, in which it (the spindle) is free to move up and down to a limited extent. A part of the lower end of the spindle is screw-threaded, as illustrated, for the purpose hereinafter fully described.

The cylinder B, with its contents—namely, the piston C, spring E, and other attachments—can be inserted in the head of the seat-pillar tube of any bicycle or such like vehicle and as easily removed from same at will. Taking it that the said complete apparatus is fitted in the head of the seat-pillar tube, as shown in the accompanying drawings, it can be adjusted in same and fixed at the desired height by means of the clip G by tightening up same.

The piston C, and consequently the saddle, it will be seen, is supported by the spring E directly or indirectly, and the piston is free to reciprocate vertically in the cylinder B, riding on the spring. Thus the weight, at the seat, of a rider of a vehicle fitted according to my invention is taken by the spring, which serves to minimize the jolting motion or concussion at the seat due to inequalities in or obstructions on the road over which the vehicle is passing.

To limit the upward travel of the piston in the cylinder and its entire disengagement from same, I fit on the top of the cylinder B a screw-cap H and reduce the diameter of the head of the piston somewhat, so as to form a shoulder, which is covered by the cap.

To assist the reciprocating movement of the piston in the cylinder, I may form a ball-race or ball-races J J in the piston lengthwise of same and corresponding races at the inside of cylinder, in which balls are placed. The piston thus reciprocates vertically on balls. I find it convenient to fit two tiers of balls in each race, separating same vertically by studs K or the like, and I keep the lower tier of balls from dropping out of the race at the bottom by means of a stud K' or the like; but I may fit one, two, or more tiers of balls, as found most convenient. The ball race or races will also serve to prevent the piston, and consequently the saddle, from swiveling—that is, turning horizontally—and to further prevent same I form or fit feathers $K^2$ $K^2$ on the inside of cylinder B, which engage with corresponding feather-ways formed in the piston lengthwise of same. Further, I split the bottom of the piston at L for a convenient distance lengthwise of same and fit the tapered screw-plug M in the bottom of piston lengthwise of same, which upon being screwed up will expand the piston, thereby serving to adjust the balls at the bottom of races, where the most wear of balls is likely to occur.

The spring E can be made of any desired strength and elasticity to best take various weights of riders on the seat, and the spring may be of any suitable form best adapted for the purpose in view, and, referring to Fig. 2, I can also adjust a spring to take varying increased initial weights by compressing same. To do this, it is only necessary to screw up the nut $d$ on the screw-threaded end of the spindle F (the nut bearing against the bottom of cylinder) before inserting the cylinder in the seat-pillar head, whereby the spindle F is brought down and the spring consequently compressed, which will then be capable of supporting a greater initial weight. The amount of compression of spring required to take a given initial weight will be indicated on the bottom flat surface $k$ of spindle F—say in pounds—and at the top of the piston C, above the cap H, a graduated figured scale of weights being set off on same. Thus a rider, finding that there is too much or too little elasticity, as the case may be, in the spring, can adjust same to the extent that he finds will secure the best riding result. The nut $d$ will fix the spindle and spring in the desired position, and the nut $e$ forms a lock-nut to the nut $d$. The head of the tapered screw M is coned and fits in a corresponding recess in the head of the spindle F, thereby serving to steady the latter and to secure it in position parallel with the sides of the cylinder B, and thus keep the spring clear of the sides of the cylinder.

It will be seen that in the arrangement of my apparatus as illustrated with reference to Fig. 2 the screw M completes the connection between the piston C and spring E.

The nut $f$ is fitted to serve as a lock-nut to the screw M. The spindle can be made hollow or solid, as found most convenient. Washers $g$, of leather or other suitable material, may be fitted at the bottom of spring, also under the cap H and under the bottom of cylinder, all with the view of deadening the concussion of the parts during movement.

Various modifications may be made in the details of my apparatus without departing from the nature of my invention. For instance, referring to Fig. 1, I may sometimes fit a fixed spindle between the bottom of cylinder and the bottom of piston of any convenient length for the purpose of supporting and taking the spring E.

Importance is attached to the portability of the apparatus, whereby the same can be fitted to the seat-pillar tube of existing types of bicycles and such like vehicles without in any way altering or weakening same.

Importance is attached to the simplicity of construction of my apparatus, the self-contained arrangement of the parts forming a complete whole in a cylinder or tube B, which can be fitted in and as readily removed from the seat-pillar tube of any bicycle and such like vehicle.

Importance is attached, in combination with the other parts of my apparatus, to the means I adopt of adjusting the spring E at will to take various initial riding weights.

Importance is attached, in combination with the other parts of my apparatus, to the use of balls for facilitating the reciprocating movement of the piston or plunger and to the method of adjustment of the balls by means of the tapered screw M.

The piston and parts contained in the cylinder may be lubricated by passing oil or other suitable lubricant down at the top of the cap H or by any other convenient means.

I do not confine myself to the use of any particular number of ball-races J or feathers $K^2$. The same will be provided in number that I find will give the best results.

The improvements are more particularly adapted for velocipedes; but I believe some of the novel features of this invention can be used to advantage in other similar carriages.

Having thus described my invention, I claim—

In a bicycle, the combination of a saddle-post split and provided with a screw-threaded opening at its lower end, a bolt to engage said opening, a spring supporting said saddle-post, a casing around said saddle-post, and anti-friction-balls located in recesses between the saddle-post and casing, substantially as described.

In testimony whereof I affix my signature in the presence of witnesses.

HENRY NEVILL.

In presence of—
 HORACE KELWAY POPE,
 H. STEUART,
 HERBERT PRIEST BLAKE.